Sept. 29, 1925.    C. T. WEYMANN    1,555,235
LIQUID LEVEL INDICATOR
Filed June 8, 1923
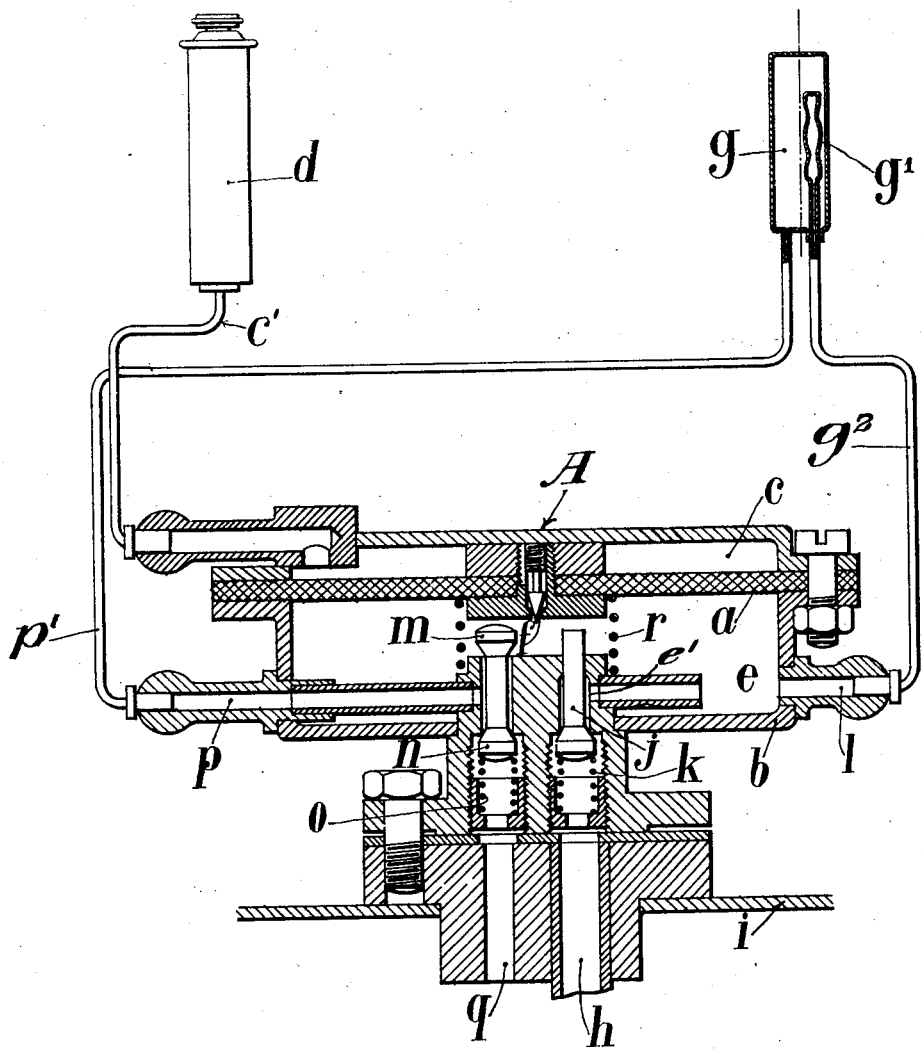
Inventor
C. T. Weymann,
By Marks&Clerk
Attys.

Patented Sept. 29, 1925.

1,555,235

UNITED STATES PATENT OFFICE.

CHARLES TORRES WEYMANN, OF PARIS, FRANCE.

LIQUID-LEVEL INDICATOR.

Application filed June 8, 1923. Serial No. 644,280.

*To all whom it may concern:*

Be it known that I, CHARLES TORRES WEYMANN, a citizen of the French Republic, residing 20 Rue Troyon, Paris, France, have invented new and useful Improvements in Liquid-Level Indicators, of which the following is the specification.

Devices are known which indicate the level (or the quantity) of liquid contained in a reservoir. These devices being essentially constituted by a tube of suitable shape and size extending within the reservoir, said tube being connected to an air pump and to a pressure gauge. The air supplied by the pump forces the liquid out of the lower end of the tube, and then escapes through the liquid contained in the reservoir. The pressure gauge indicates the pressure existing at this moment in the tube, pressure which is proportional to the level of the liquid above the lower end of the plunger tube.

The present invention has for its object improvements in these devices, such improvements essentially consisting in the arrangement on the pipe line connecting the liquid reservoir to the pneumatic device and to the level-indicating device, of a control member constituted by a distortable diaphragm preserved from the action of atmospheric pressure, and in the use as a level indicator, of a pressure gauge the distortable member of which is also preserved from the action of atmospheric pressure.

With the foregoing object outlined and with other objects in view, which will appear as the description proceeds, the invention consists in the novel features hereinafter described in detail, illustrated in the accompanying drawing, and more particularly pointed out in the appended claims.

In the drawing, a vertical sectional view of the device is illustrated.

The device according to the present invention consists essentially of a tank fitting A, a pressure furnishing means, such as a pump $d$, and a pressure operated indicator $g$, $g'$ all operatively connected by tubes or the like. The pressure gauge in the present instance, is constituted by a fluid-tight casing $g$ adapted to communicate with the liquid reservoir $i$ and containing a distortable member $g^1$ (diaphragm, Bourdon tube, manometric diaphragm or the like) which may communicate with a tube $h$ immersed in the liquid. These parts cooperate with the distortable member $a$ to automatically establish: 1st; during measuring, the static equilibrium of the pressures existing on the face of the distortable member of the pressure gauge and above the level of the liquid in the reservoir. 2nd; at rest, the absolute equilibrium of the pressures existing on both faces of the distortable member of the said pressure gauge.

The control member is essentially constituted by a distortable diaphragm $a$ dividing a tank-fitting box $b$ into two chambers $c$ and $e$. One of the chambers $c$ is in constant communication through pipe $c'$ with the pressure furnishing means (a pump $d$ for instance) and also communicates with the other chamber $e$ through a valve controlled orifice $f$ of determined diameter provided in the distortable member $a$. The port $f$ permits the compressed air to pass from chamber $c$ to the chamber $e$, but it restricts the passage of the air sufficiently to build up a pressure in the chamber $c$ which will eventually cause the depression of the central portion of the diaphragm $a$. The second chamber $e$ communicates, by way of pipe $g^2$ and nipple $l$ with the distortable member $g^1$ of the pressure gauge, and it may communicate by passageway $e'$, with a tube $h$ extending into the reservoir $i$ and terminating near the bottom of the latter. The passageway $e'$ has a valve $j$ controlled by the distortable partition $a$. In the example shown, the diaphragm is subjected to the pressure of a spring $r$ acting in a direction opposite to the pneumatic pressure (which can be created by the pump $d$ for instance) in the chamber $c$.

This diaphragm, during its displacements can act on the stem of the valve $j$, which is subjected to the action of a spring $k$, acting in such a manner as to normally cut off communication between the chamber $e$ and the tube $h$ extending into the reservoir $i$.

Below the diaphragm is arranged a double valve $m$, $n$, subjected to the action of a spring $o$. This valve controls, on the one hand, communication of the portion of the reservoir $i$ situated above the level of the liquid, with an outlet $p$ connected by pipe $p'$ with the casing $g$ of the pressure gauge, and, on the other hand, controls communication of the said outlet $p$ with the corresponding chamber $e$ of the tank fitting.

At rest, (position illustrated in the drawing) the double valve $m$, $n$ under the influence of its spring o, closes the conduit q against communication with e and p and allows the outlet p to communicate with the chamber e, into which opens, as described, the pipe line $q^2$ leading to the distortable member $g^1$ of the pressure gauge. It is thus possible to obtain static equilibrium between the two faces of the distortable member $g^1$ of the pressure gauge. This member becomes therefore inert and is not normally subjected to any prejudicious tension.

For effecting a measuring operation, the pressure furnishing means d is actuated to increase the pressure in chamber c. This causes the distortable partition to move and ensures the operation of the pressure gauge or indicating device. As the distortable partition a moves downwardly, it pushes back the valve j, so as to put in communication (through the chamber e and the pipe line $q^2$), the tube h and the interior of the distortable member $g^1$ of the pressure gauge. Simultaneously, the distortable diaphragm a moves the double valve m, n, to place the casing g in communication with the air or gas space of the reservoir i, and close communication between e and g.

The pressure gauge thus exactly indicates the difference of the pressures existing in the tube h and in the air or gas space of the reservoir i, and permits the exact determination of the height of the level of the liquid, it is desired to measure.

What I claim and desire to secure by Letters-Patent is:

1. In a device of the character described, a tank fitting including a casing, a distortable diaphragm dividing the casing into first and second chambers, a passageway in the diaphragm placing said chambers in communication, an inlet connected to the first chamber and adapted to be connected to an air pressure furnishing means to permit air under pressure to be introduced into the first chamber for distorting the diaphragm, a tube connected to the tank fitting and adapted to be inserted into a tank and to receive liquid in the tank, a passageway placing said tube in communication with the second chamber, a normally closed valve for said passageway arranged to be opened by the diaphragm when the latter is distorted, a pressure responsive indicator, a tube connecting said indicator to the second chamber, an outlet for the second chamber, and a second valve controlling said outlet, arranged to be closed by the diaphragm when the latter is distorted, and normally open to permit the outlet to communicate with the interior of the second chamber.

2. In a device of the character described, a tank fitting including an air tight casing, a distortable diaphragm arranged in the casing and dividing the interior of the same into first and second chambers, a port in the diaphragm placing said chambers in communication, means for introducing gas under pressure into the first chamber for distorting the diaphragm and passing gas under pressure from the first to the second chamber, a tube connected to the tank fitting and adapted to be inserted in the liquid in a tank, a passageway placing the second chamber in communication with said tube, a first valve normally closing said passageway and arranged to be opened by the diaphragm when the latter is distorted, so as to permit gas under pressure to pass from the second chamber into the tube and force liquid of the tank from the same, a pressure responsive indicator normally communicating with the second chamber and arranged to receive gas under pressure at the same time that said gas flows into said tube, an outlet for the second chamber communicating with the latter, and a normally opened valve for said outlet arranged to be closed by the diaphragm when the latter is distorted.

3. A device as claimed in claim 2 in which an air tight casing surrounds the pressure responsive indicator, and a conduit places the interior of said casing in communication with said outlet.

4. In a device of the character described, a tank fitting, a pressure gas furnishing means, and a pressure responsive indicator, said tank fitting including an air tight casing, a diaphragm in the casing dividing the interior of the latter into first and second chambers, a pipe placing the first chamber in communication with the pressure gas furnishing means, a port placing said chambers in communication and restricting the flow of air from one chamber to the other, a tube connected to the tank fitting and adapted to extend into the liquid in a tank, a passageway placing the second chamber in communication with said tube, a normally closed first valve normally out of contact with the diaphragm and normally closing said passageway, said valve being arranged to be actuated by the diaphragm when the latter is moved under the influence of gas under pressure introduced into the first chamber, a pipe connecting the pressure responsive indicator to the second chamber to permit the pressure gas to act on the indicator at the same time that the pressure gas is flowing from the second chamber into said tube, an outlet for the second chamber, and a second valve normally out of contact with the diaphragm and arranged to close said outlet when the diaphragm is moved under the influence of said pressure gas.

5. In a device of the character described, a tank fitting including an air tight casing provided with a distortable diaphragm dividing the interior of the casing into first and second chambers, a port in said diaphragm for placing said chambers in communication and restricting the flow of air from one chamber to the other, an air inlet member connected to the casing for furnishing air under pressure to the first chamber for distorting said diaphragm, a pressure responsive indicator a tubular member on the casing adapted to connect the second chamber to said pressure responsive indicator, a tubular outlet for the second chamber, a tube connected to the casing and adapted to be inserted into liquid to be measured, a passageway placing said tube in communication with the second chamber, a first valve normally closing said passageway and arranged to be opened by the diaphragm when the latter is distorted, and a second normally opened valve for the outlet arranged to be closed by the diaphragm when the latter is distorted.

6. In a device of the character described, a tank fitting including an air tight casing, a diaphragm dividing the interior of the casing into first and second chambers, a port placing said chambers in communication and restricting the flow of air from one chamber to the other, means connected to the first chamber for furnishing gas under pressure to the latter, a pressure responsive indicator operatively connected to the second chamber and adapted to be actuated by said gas under pressure, a tube connected to said casing and adapted to be inserted in the liquid to be measured, a passageway placing the interior of the tube in communication with the second chamber, a normally closed valve for said passageway arranged to be struck and opened by the diaphragm when the latter is distorted, a second passageway adapted to communicate with the air space of the tank containing the liquid to be measured, an outlet communicating with the second passageway and normally communicating with the interior of the second chamber, a duplex valve normally closing communication between the second passageway and said outlet and permitting communication between the outlet and the interior of the second chamber, said duplex valve arranged to be closed by the diaphragm when the latter is distorted, to close communication between the outlet and second chamber and to open communication between the outlet and the second passageway, an air tight casing surrounding the pressure responsive indicator, and a pipe placing the outlet in communication with the last mentioned casing.

7. In a device of the character described, an air tight casing, a diaphragm arranged in the casing and dividing the interior of the same into first and second chambers, a port placing said chambers in communication and restricting the flow of air from one passage to the other, means for furnishing a gas under pressure to the first chamber, a passageway in the casing opening into the second chamber, a valve in the passageway, means for normally closing the valve and forcing the same toward the diaphragm, said valve being arranged to be opened by the diaphragm when the latter is moved, a pressure responsive indicator operatively connected to the second chamber, an outlet for the second chamber, a second valve adapted to be engaged by the diaphragm for closing the outlet when the diaphragm is moved, and means for normally holding the second valve in open position.

In testimony whereof I have signed my name to this specification.

CHARLES TORRES WEYMANN.